United States Patent [19]

Plank et al.

[11] Patent Number: 4,585,853

[45] Date of Patent: Apr. 29, 1986

[54] ACID GROUP-CONTAINING HYDROPHILIC CO-CONDENSATION PRODUCTS OF KETONE-ALDEHYDE RESINS

[75] Inventors: Johann Plank; Alois Aignesberger, both of Trostberg, Fed. Rep. of Germany

[73] Assignee: SKW Trostberg Aktiengesellschaft, Trostberg, Fed. Rep. of Germany

[21] Appl. No.: 589,471

[22] Filed: Mar. 14, 1984

[30] Foreign Application Priority Data

Apr. 27, 1983 [DE] Fed. Rep. of Germany ....... 3315152

[51] Int. Cl.$^4$ .................... C08G 12/00; C08G 8/00; C08G 4/00
[52] U.S. Cl. .................... 528/227; 528/220; 528/226
[58] Field of Search .................... 524/27, 33, 72, 74; 528/220, 226, 227, 228, 229

[56] References Cited

U.S. PATENT DOCUMENTS

| | | | |
|---|---|---|---|
| 2,321,451 | 6/1943 | Bauer | 528/156 |
| 2,640,043 | 5/1953 | Sturm | 524/541 |
| 2,674,591 | 4/1954 | White et al. | 528/227 |
| 2,766,218 | 10/1956 | Harvey et al. | 528/227 |
| 3,122,523 | 2/1964 | Josten | 528/227 |
| 3,947,425 | 3/1976 | Freeman et al. | 525/504 |

FOREIGN PATENT DOCUMENTS 2916705 11/1979 Fed. Rep. of Germany .
2249047 5/1975 France .

*Primary Examiner*—Maurice J. Welsh
*Assistant Examiner*—Nathan M. Nutter
*Attorney, Agent, or Firm*—Felfe & Lynch

[57] ABSTRACT

The present invention provides acid group-containing, hydrophilic co-condensation products of ketone-aldehyde resins which are obtainable by the co-condensation of at least one ketone and at least one aldehyde with at least one acid group-introducing compound and with at least one aminoplast former and/or aromatic compound and/or at least one condensation product thereof and/or with at least one ligninsulphonate resin and/or cellulose derivative.

The present invention also provides a process for producing these co-condensation products and applications of thickening agents, retention agents, surface-active agents, dispersion agents and plasticizing agents consisting of or comprising these co-condensation products.

15 Claims, No Drawings

ACID GROUP-CONTAINING HYDROPHILIC CO-CONDENSATION PRODUCTS OF KETONE-ALDEHYDE RESINS

The present invention is concerned with acid group-containing hydrophilic co-condensation products of ketone-aldyhyde resins.

The base-catalysed condensation of ketones with aldehydes has been known for a long time. It leads, in its end stage, to water-insoluble resins (cf. e.g. J. Scheiber,"Chemie und Technologie der künstlichen Harze", Volume 1, Stuttgart, 1961, page 164 et seq.).

The introduction of acid groups into the ketone-aldehyde resin makes possible the formation of water-soluble condensation products. Thus, for example, from Federal Republic of Germany Patent Specification No. 23 41 923, there are known readily water-soluble condensation products obtained from cycloalkanones, formaldehyde and sulphite which can be used, for example, as additives for inorganic binding agents for the improvement of their properties. Other known additives for the same purpose are condensation products obtained from formaldehyde, acid group-introducing compounds and aminoplast formers, such as urea or melamine (cf. Federal Republic of Germany Patent Specifications Nos. (16 71 058 and 23 59 291).

However, these known condensation products suffer from some disadvantages: one particular disadvantage of the water-soluble cycloalkanone-aldehyde condensation products is their very low thermal stability; thus, for example, the evaporation of an aqueous solution of cycloalkanone-formaldehyde condensation products, even under gentle conditions (about 50° C.), results in the formation of substantially water-insoluble, powdery compounds; melamine resins are, because of the relatively expensive starting material melamine, only of limited suitability for a large-scale use; urea resins possess a low storage life and lignin-sulphonate resins, which are produced from sulphite-containing spent liquors obtained from the paper industry and frequently contain impurities, are of non-uniform quality and display undesired side effects, as, for example, a retardation of cement hydration.

Federal Republic of Germany Patent Specification No. 29 16 705 describes the production of a resin product by the co-condensation of a sulphite-modified melamine resin with lignin sulphonate-urea-formaldehyde resins. In this way, the problem of the expensive starting material melamine arising in connection with melamine resins is admittedly solved by partial replacement thereof with lignin sulphonate-urea; however, the production of these resins is a very laborious, multi-step process with very high and uneconomic production costs.

Therefore, it is an object of the present invention to provide water-soluble condensation products which are very suitable as additives for the improvement of the properties of aqueous systems, which are obtainable in an economic manner and which do not show the above-mentioned disadvantages.

Thus, according to the present invention, there are provided acid group-containing hydrophilic co-condensation products of ketone-aldehyde resins which are obtainable by the co-condensation of at least one ketone and at least one aldehyde with at least one acid group-introducing compound and with at least one aminoplast former and/or aromatic compound and/or at least one condensation product thereof and/or with at least one lignin sulphonate resin and/or cellulose derivative.

In contradistinction to the non co-condensed cycloalkanone-aldehyde resins, the co-condensation products according to the present invention possess a surprisingly high thermal stability. Therefore, they are valuable additives which, on the basis of their inexpensive starting materials and of the simple and economic production thereof, are also suitable for a large-scale use.

The acid groups present in the condensation products according to the present invention are preferably carboxy, phosphono, sulphino and especially sulpho groups. These groups can also be attached via nitrogen or oxygen or via -N-alkylene or O-alkylene bridges and are then, for example, sulphamido, sulphooxy, sulphoalkoxy, sulphinoalkoxy or also phosphonooxy groups. The alkyl moiety present in these radicals preferably contains up to 5 carbon atoms and is especially methyl or ethyl. The condensation products according to the present invention can also contain two or more different acid groups.

The aldehydes used for the production of the co-condensation products according to the present invention can be represented by the general formula R—CHO, in which R is a hydrogen atom or an aromatic or non-aromatic (cyclic or acyclic) carbo- or heterocyclic radical or also an araliphatic radical, in which the number of the carbon atoms or carbon and heteroatoms is preferably up to 10. Aromatic radicals can be, for example, $\alpha$- or $\beta$-naphthyl or phenyl or furfuryl; araliphatic radicals can be, for example, benzyl or phenethyl; non-aromatic radicals can be, for example, cycloalkyl and especially alkyl radicals, preferably with up to 6 carbon atoms, for example methyl, ethyl, propyl or butyl. Aliphatic radicals can also be branched or unsaturated and include, for example, vinyl.

The aldehydes can also be substituted by one or more substituents which do not adversely influence the condensation reaction, for example by amino, hydroxyl, alkoxy or alkoxycarbonyl groups, and/or also by the acid groups contained in the condensation products. Alkehydes with more than one aldehyde group, for example di- or trialdehydes, also can be used and might be especially expedient in some cases, because of their increased reactivity. There can also be used, for example in the case of the lower saturated aldehydes, such as formaldehyde or acetaldehyde, the polymeric forms thereof, as, for example, paraformaldehyde or paraldehyde.

Examples of saturated aliphatic aldehydes include formaldehyde (or paraformaldehyde), acetaldehyde (or paraldehyde) and butyraldehyd; examples of substituted saturated aliphatic aldehydes include 3-methoxypropionaldehyde and acetaldol; examples of unsaturated aliphatic aldehydes include acrolein, crotonaldehyde, furfurol, 4-methoxyfurfurol and propargyl aldehyde; and examples of dialdehydes include glyoxal or glutardialdehyde. As aldehyde, formaldehyde is especially preferred.

Ketones used for condensation products according to the present invention are symmetrical or asymmetrical ketones with preferably acyclic aliphatic, araliphatic and/or aromatic hydrocarbon radicals, at least one radical being non-aromatic, and/or cycloalkanones.

Acyclic aliphatic radicals are straight-chained or branched, unsaturated or preferably saturated aliphatic radicals, for example methyl, ethyl, propyl, n-butyl, isobutyl and nonyl. Araliphatic radicals include, for example, benzyl and phenethyl, and aromatic radicals include, for example, α- and β-naphthyl and especially phenyl. The cycloalkanones used are preferably derived from cyclopentane or cyclohexane or from their methyl-substituted derivatives.

The ketones can also be substituted by one or more substituents which do not adversely influence the condensation reaction, for example by amino, hydroxyl, alkoxy or alkoxycarbonyl groups, and/or also by the acid groups contained in the condensation products.

Examples of saturated acyclic ketones include acetone, methyl ethyl ketone and methyl iso-butyl-ketone; examples of substituted saturated acyclic ketones include methoxyacetone, diacetone alcohol and ethyl acetoacetate; examples of unsaturated aliphatic ketones include methyl vinyl ketone, mesityl oxide and phorone; examples of araliphatic ketones include acetophenone, 4-methoxyacetophenone and 4-acetylbenzenesulphonic acid; and examples of diketones include diacetyl, acetylacetone and benzoylacetone.

The aldehydes and ketones can be used not only in pure form but also in the form of addition compounds with the material introducing the acid groups, for example as aldehyde sulphite adducts or as hydroxymethanesulphinic acid salts. Two or more different aldehydes and/or ketones can also be used.

The total number of carbon atoms or possibly of carbon atoms and heteroatoms in the aldehydes and ketones used according to the present invention is so chosen that the hydrophilic character of the condensation products is retained. Therefore, it also depends from the number of acid groups in the condensation product as well as from the ratio of ketone/aldehyde and of the other components. The preferred total number of such atoms amounts to 1 to 11 for the aldehydes and to 3 to 12 for the ketones.

In general, the molar ratio of ketones/aldehydes/acid groups amounts to 1/1 to 6/0.02 to 2, but, depending from the particular intended use, variations are also possible.

The aminoplast formers which can be used according to the present invention include all aminoplast formers conventionally used for aminoplasts and especially for the condensation with formaldehyde, preferrably melamine and/or urea, guanamides, dicyandiamide and also, for example, aminoacetic acid.

The aromatic compounds which can be used according to the present invention include all phenols suitable for the formation of phenolic resins, especially phenol, cresols and xylenols, as well as reactive substituted and/or polynuclear aromatic compounds as, for example, naphthalene and its derivatives.

Instead of the aminoplast formers and/or phenols, their precondensates or condensation products of various degrees of condensation, especially their condensation products with formaldehyde, as, for example, Novolake, also can be used wholly or partly. Acid group-containing aminoplast formers and aromatic compounds, for example naphthalene-sulphonic acids, can be used, too.

Lignin sulphonate resins used according to the present invention are the lignin sulphonates formed in the treatment of wood with sodium sulphite (sulphite process) and/or reaction or condensation products of lignin materials, e.g. with formaldehyde or formaldehyde/sodium sulphite.

Cellulose derivatives are especially cellulose esters, for example cellulose acetate, and, in particular, cellulose ethers, for example methylcellulose, hydroxymethylcellulose, hydroxyethylcellulose and carboxymethylcellulose.

The proportion of aminoplast formers and/or of aromatic compounds or of their condensates, of lignin sulphonate resins and/or of cellulose derivatives depends especially upon the intended use of the product. In general, it amounts to 2 to 50% by weight and especially to 10 to 40% by weight, referred to the final condensation product, but upward and downward variations are possible.

On the basis of their properties, the co-condensation products according to the present invention can be used as thickening agents, dispersing agents, surface-active agents (tensides) and retention agents but also as plasticizing agents, especially for aqueous sytems. The desired properties herein can be controlled by appropriate choice of the starting compounds and of the molar ratios. Examples of aqueous systems in which the products according to the present invention can advantageously be used, are inorganic binding material suspensions and solutions, pigment and dyestuff dispersions, oil-in-water emulsions, aqueous kaolin or clay suspensions, coal-water and oil-water-coal slurries. As a result of their good thermostability, the co-condensation products according to the present invention are also very suitable as additives for inorganic binding material. As dispersing agents, they can be used, for example, for the production of flowing concrete or flowing screeds or for the dispersion of oil well cement slurries which, due to the high temperatures occurring, require sufficient thermal stability. Surface-active agents according to the present invention lower the surface tension of aqueous solutions and can be used, for example, as foaming agents in the production of foamed concrete. In the same way, they can be used as air entraining agents in mortar or concrete or as surfactants in the case of enhanced oil recovery processes. As retention agents, they can be used for the production of suspensions of hydraulic binding materials which display good water-retention properties, for example in the case of oil well cement slurries or in the case of tile adhesives, and, as thickening agents, they can be used advantageously, for example, in oil industrial processes for increasing the viscosity of aqueous solutions and suspensions.

The co-condensation products are preferably used in the form of solutions or dispersions and especially in the form of aqueous solutions or dispersions. In general, the solids content of these compositions is 10 to 70 and especially 20 to 50% weight.

Use can also be made of two or more of the co-condensation products according to the present invention with the same, similar and/or also different effectiveness or mixtures thereof with one or more known additives with the same, similar and/or different effectiveness, for example mixtures with known dispersants, surfactants or concrete additives. In this way, the properties of the end products often can also be changed additionally or differentiated.

The predominating properties of the co-condensation products according to the present invention depend especially on the nature and on the molar ratio of the components. The hydrophilic character decreases with a lowering proportion of acid groups and, as a rule, at a value of less than 0.02 mole, a complete water-solubility cannot be achieved.

For dispersing agents, formaldehyde, glyoxal and acetone and a ratio of ketone/aldehyde/acid groups of ½ to 4/0.25 to 0.75 are preferrably used. For surface-active agents, there are preferably used aldehydes and ketones with comparatively long alkyl raadicals or with aralkyl radicals which contain at least more than one carbon atom, and a ratio of ketone/aldehyde/acid groups of 1/1 to 6/0.05 to 1. For retention and thickening agents, there are used aldehydes and ketones with alkyl radicals which contain up to 3 carbon atoms, and a molar ratio of ketone/aldehyde/acid groups of ½ to 6/0.3 to 2.

Furthermore, the nature of the co-condensation components determine the prodominating properties of the co-condensation products according to the present invention: reaction of the ketone-aldehyde resins with aminoplast formers, aromatic compounds and/or their condensation products brings about an improvement of the dispersing properties, whereas by co-condensation with cellulose derivatives, a retention and thickening action of the resinous product can be achieved. The incorporation of lignin sulphonate resins brings about not only an increase in dispersing effects but also in surface-active properties.

By combination of the conditions preferably employed for obtaining the specific properties, for example by combination of the nature of the starting materials especially preferred for a particular property with the molar ratio preferred for another nature, mixed properties also can be achieved. Therefore, the present invention is also concerned with the use of the products according to the present invention as thickening agents, retention agents, surface-active agents, dispersing agents and/or plasticizing agents, especially as additives for aqueous systems.

The condensation products according to the present invention can be obtained by reaction of the components under alkaline pH value conditions, it being possible to proceed in the manner of a one-pot reaction. In general, the aldehyde is added to a solution or suspension of the remaining components; however, other process variants also may be applied, for example the addition of the co-condensation components and/or of the ketone, addition of a mixture of aldehyde and acid group-introducing compound, addition of a mixture of ketone and acid group-introducing compound or of a compound of the ketone with the acid group-introducing compound to the remaining components, or simultaneously taking all of the components.

In general, the reaction already commences upon gentle heating and then proceeds exothermally so that, as a rule, cooling is necessary. For the achievement of a uniform product or especially in the case of the use of less reactive starting materials, a subsequent heating is preferable, which can last for up to several hours.

In general, the reaction is carried out at a pH of 7 to 14 and preferably of 10 to 12. The pH adjustment can take place, for example, by the addition of hydroxides of mono- or divalent cations or by the presence of an acid group-introducing material, for example of sodium sulphite, which hydrolyses in aqueous solution with an alkaline reaction.

The reaction can be carried out not only in homogeneous phase but also in heterogeneous phase. The reaction medium employed is usually water or a water-containing mixture, the proportion of water preferably being at least 50% by weight. As non-aqueous solvent additions, it is especially preferred to use polar organic solvents, for example alcohols or acid esters. The reaction can be carried out not only in an open vessel but also in an autoclave, in which case it can be desirable to work in an inert gas atmosphere, for example under nitrogen.

If desired, the co-condensation products can be isolated after the reaction from the solutions and dispersions obtained, for example by evaporation on a rotary evaporator or by spray drying. However, the solutions or dispersions obtained can also be used directly as such.

The aldehyde and ketone starting materials used are the above-mentioned aldehydes and ketones and mixtures of ketones and/or aldehydes can also be used. The aldehydes and ketones can be used not only in pure form but also as compounds with the acid group-introducing substance, for example as bisulphite addition compounds. They can be taken or added not only in aqueous solution but also in non-aqueous solution, for example in alcoholic solution.

In the case of aldehydes and ketones with a low alkyl chain, the reaction takes place especially fast and exothermally, whereas in the case of compounds with sterically extended substituents, for example methyl isobutyl ketone or benzylacetone, a subsequent long thermal treatment is necessary to complete the reaction.

The acid group-introducing compounds used can be all compounds introducing the acid groups under the condensation conditions, for example pole acids, salts of acids with more - to trivalent inorganic or organic cations or addition compounds, especially addition compounds with the aldehyde and ketones, can be used according to the invention. Examples therefor include sulphites, hydrogen sulphites, pyrosulphites, bisulphite addition compounds of aldehydes or ketones, amidosulphonic acid salts, taurine salts, sulphanilic acid salts; hydroxymethane-sulphinic acid salts; aminoacetic acid salts; and phosphorous acid salts. The acid groups can, however, also be introduced wholly or partly by using acid group-containing aminoplast formers, aromatic compounds and/or their condensates, or by using appropriate acid group-containing lignin sulphonates and/or cellulose derivatives.

The following Examples are given for the purpose of illustrating the present invention. Unless stated otherwise, parts and percentages are parts by weight and percentages by weight.

EXAMPLE 1

Dispersing agent

In a stirring vessel equipped with internal thermometer and condenser there are placed, in the given order
1800 parts by weight of water
630 parts by weight of sodium sulphite
378 parts by weight of melamine
406 parts by weight of acetone
and heated until acetone reflux appears.

To the white suspension thus obtained with a temperature of about 60° C., from a storage vessel 3000 parts by weight of 30% formaldehyde solution are added, the temperature of the batch thereby being increased to 95° C. at the end of the formalin introduction.

Subsequent to the formalin introduction, the batch is subjected to a heating at 95° C. for 30 minutes. Subsequently the solution is cooled and adjusted to a weakly alkaline pH.

A deep red and low viscosity solution is obtained with a solids content of 32%. The product can be used as dispersing agent for cement slurries.

EXAMPLE 2

Dispersing agent

In a stirring vessel equipped with internal thermometer and condenser
- 1000 parts by weight of water
- 8400 parts by weight of a 30% formaldehyde solution
- 3500 parts by weight of melamine
- 2800 parts by weight of sodium pyrosulphite
- 732 parts by weight of a 20% aqueous sodium hydroxide solution are placed and an alkaline melamine resin precondensate according to the process described in German Patent Specification No. 2,359,291 is produced.

To this batch are also added at 50° C.
- 3000 parts by weight of water
- 3150 parts by weight of sodium sulphite
- 2900 parts by weight of acetone followed by heating until acetone reflux appears. Subsequently, 15,000 parts by weight of 30% formaldehyde solution are fed in from a storage vessel, the temperature of the batch being increased to 95° C. at the end of the formalin addition.

Subsequent to the formalin introduction, a 30 minute thermal treatment of the batch is carried out at 90° to 95° C., whereafter it is cooled to ambient temperature and adjusted to a weakly alkaline pH.

The low viscosity co-condensate obtained has a solids content of 34% and displays dispersing properties.

EXAMPLE 3

Dispersing agent

Into the stirring vessel used in Example 1, there are placed in the given order
- 5830 parts by weight of water
- 1334 parts by weight of solid sodium hydroxide
- 1250 parts by weight of aminoacetic acid
- 1567 parts by weight of phenol
- 967 parts by weight of acetone and the mixture is heated until acetone reflux appears.

A total of 5000 parts by weight of 30% formaldehyde solution is run into the batch from a storage vessel, the temperature of the batch being increased up to 98° C. at the end of the formalin introduction.

Subsequent to the formalin introduction, the solution is kept at 95° C. for another hour and, after cooling to ambient temperature, rendered weakly alkaline.

The orange-red, low viscous resin solution obtained has a solids content of 36% and reduces the viscosity of aqueous cement slurries.

EXAMPLE 4

Surface-active agent

The stirring vessel used in Example 1 is supplied in the given sequence with
- 1000 parts by weight of water
- 350 parts by weight of a 56% calcium sulphite spent liquor, originated from company Chemiefaser Lenzing (Austria)
- 315 parts by weight of sodium sulphite
- 360 parts by weight of methyl ethyl ketone and the batch then heated to 60° C.

Subsequently, a total of 1250 parts by weight of 30% formaldehyde solution is added to the batch from a storage vessel, the temperature of the reaction mixture increasing to 95° C.

After completion of the formalin introduction, a 15 minute thermal after-treatment of the reaction product at 95° C. is carried out followed by cooling to ambient temperature, whereafter a weakly alkaline pH is adjusted.

The co-condensation product present in the dark brown solution obtained shows surface-active properties and lowers, for example, the surface tension of water.

EXAMPLE 5

Retention/thickening agent

In the stirring vessel used in Example 1, there are placed
- 1000 parts by weight of water
- 25 parts by weight of sodium sulphite
- 30 parts by weight of the hydroxyethyl cellulose "Tylose H 300 P" of Hoechst
- 44 parts by weight of acetone and the batch is heated to 56° C., with vigorous stirring, whereafter a total of 150 parts by weight of 30% formaldehyde solution are added, the temperature of the batch being increased to 90° C.

At the end of the formalin introduction, condensation at 95° C. is carried out for 1 hour. In order to maintain the stirrability of the batch, the solution has to be diluted during the condensation with a total of 750 parts by weight of water, according to the extent of the condensation's progress.

The orange-red co-condensate obtained has a solids content of 6% and a Brookfield viscosity of 70,000 cP at 20° C. It imparts good water retention to cement slurries.

EXAMPLE 6

Retention/thickening agent

The reaction vessel used in Example 1 is supplied with
- 1500 parts by weight of water
- 252 parts by weight of sodium sulphite
- 90 parts by weight of urea
- 435 parts by weight of diacetone alcohol and the mixture is heated to 60° C., whereafter a total of 1500 parts by weight of 30% formaldehyde solution is added thereto. During the formalin introduction, the temperature is increased to 90° to 95° C.

Subsequent to the formalin introduction, a 90 minutes postheating of the batch is carried out at 95° C. The solution is diluted then with a total of 500 parts by weight of water according to the extent of the condensation's progress in order to maintain its stirrability. After cooling to ambient temperature, it is subsequently adjusted to a weakly alkaline pH.

The red solution of the co-condensate obtained has a solids content of 24% and a Brookfield viscosity of 300,000 cP at 20° C. The product thickens aqueous cement slurries and acts as a retention agent.

We claim:

1. Acid group-containing thermostable hydrophilic co-condensation products of ketone-aldehyde resins obtainable by co-condensation, at a pH of 7 to 14, of at least one ketone and at least one aldehyde with at least one acid group-introducing compound and with at least one aromatic compound.

2. Co-condensation products according to claim 1, wherein the ketone used is a symmetrical or asymmetrical ketone with acyclic aliphatic, araliphatic and/or aromatic radicals, at least one radical being a nonaromatic radical, and/or a cycloalkanone.

3. Co-condensation products according to claim 1 or 2, wherein, as acid groups, they contain carboxy, phosphono, sulphino, sulpho, sulphamido, sulphoxy, sulphoalkoxy, sulphinoalkoxy and/or phosphonooxy groups.

4. Co-condensation product according to claim 1, wherein the molar ratio of ketones/aldehydes/acid group introducing compounds is 1/1–6/0.02–2.

5. Co-condensation product according to claim 1, wherein the proportion of aromatic compounds is 2 to 50% by weight, referred to the final condensation product.

6. Co-condensation products according to claim 5, wherein the proportion of aromatic compounds is 10 to 40% by weight, referred to the final condensation product.

7. Process for the production of co-condensation products according to claim 1 comprising reacting at least one ketone and at least one aldehyde with at least one acid group introducing compound and with at least one aromatic compound.

8. Process according to claim 8, wherein the reaction is carried out at a pH of 10 to 12.

9. Process according to claim 7, wherein, as acid group-introducing compound, there is used the corresponding pure acid, a salt of this acid with a mono- to trivalent cation or an addition compound of the acid with an aldehyde or ketone.

10. Process according to claim 7, wherein, as acid group-introducing compound, there is used an acid group-containing aromatic compound.

11. Process according to claim 7, wherein the aldehyde and/or ketone is used in the form of an addition compound with the acid corresponding to the acid groups.

12. Co-condensation product of claim 1 wherein formaldehyde, glyoxal and acetone are used and a ratio of ketone/aldehyde/acid groups of about ½ to 4/0.25 to 0.75 is used.

13. Co-condensation product of claim 1 wherein aldehydes and ketones with long alkyl radicals or with aralkyl radicals with at least two carbon atoms are used and a ratio of ketone/aldehyde/acid groups of 1/1 to 6/0.05 to 1 is used.

14. Co-condensation product of claim 1 wherein the aldehyde and ketone used have up to 3 carbon atoms in each alkyl group and a molar ratio of ketone/aldehyde/to acid group of ½ to 6/0.3 to 2 is used.

15. Co-condensation product of claim 1 wherein the acid group introducing compound is a sulphite, hydrogen sulfite, pyrosulphite, bisulphite addition compound of aldehydes or ketones, amidosulphonic acid salts, taurine salts, sulphonilic acid salts; hydroxymethanesulphinic acid salts; aminoacetic acid salts; or phosphorous acid salts.

* * * * *